US012659655B2

(12) United States Patent
Xu

(10) Patent No.: US 12,659,655 B2
(45) Date of Patent: Jun. 16, 2026

(54) METHOD AND DEVICE FOR TRANSMITTING AUDIO DATA BASED ON BLUETOOTH LOW ENERGY

(71) Applicant: Nanjing Zgmicro Company Limited, Nanjing (CN)

(72) Inventor: Bin Xu, Nanjing (CN)

(73) Assignee: Nanjing Zgmicro Company Limited, Nanjing (CN)

( * ) Notice: Subject to any disclaimer, the term of this patent is extended or adjusted under 35 U.S.C. 154(b) by 607 days.

(21) Appl. No.: 18/108,995

(22) Filed: Feb. 13, 2023

(65) Prior Publication Data

US 2023/0199382 A1       Jun. 22, 2023

Related U.S. Application Data

(63) Continuation of application No. PCT/CN2021/095017, filed on May 21, 2021.

(30) Foreign Application Priority Data

Aug. 13, 2020    (CN) .......................... 202010810786.9

(51) Int. Cl.
*H04R 3/00* (2006.01)
*H04W 4/80* (2018.01)
(52) U.S. Cl.
CPC ................ *H04R 3/00* (2013.01); *H04W 4/80* (2018.02); *H04R 2420/07* (2013.01)
(58) Field of Classification Search
CPC .................................... H04R 3/00; H04W 4/80
See application file for complete search history.

(56) References Cited

U.S. PATENT DOCUMENTS

| | | | | |
|---|---|---|---|---|
| 9,893,744 | B1 * | 2/2018 | Patel | ..................... H04W 76/16 |
| 10,264,031 | B2 * | 4/2019 | Das | ..................... H04L 67/104 |

(Continued)

FOREIGN PATENT DOCUMENTS

| | | |
|---|---|---|
| CN | 101090303 A | 12/2007 |
| CN | 110856077 A | 2/2020 |

(Continued)

OTHER PUBLICATIONS

International Search Report received for PCT/CN2021/095017, dated Aug. 9, 2021.

(Continued)

*Primary Examiner* — David Bilodeau
(74) *Attorney, Agent, or Firm* — Zhong Law, LLC

(57) ABSTRACT

A method and a device for transmitting audio data based on Bluetooth low energy are disclosed. The method comprising: obtaining a plurality of audio data frames to be transmitted; dividing a quantized spectrum of each audio data frame into M groups of spectrum respectively, wherein M is a positive integer greater than 1; dividing each audio data frame into N groups of data based on the M groups of spectrum, wherein N is a positive integer greater than 1, and the N groups of data have different transmission priorities; and transmitting the N groups of data according to their respective transmission priorities within a preset transmission times range based on a predetermined Bluetooth low energy transmission protocol, wherein the group of data with a lower transmission priority is transmitted only after the group of data with a higher transmission priority is received correctly.

16 Claims, 6 Drawing Sheets

(56)                    References Cited

U.S. PATENT DOCUMENTS

| | | | |
|---|---|---|---|
| 2007/0274209 A1* | 11/2007 | Aarnio | H04L 1/0083 |
| | | | 370/470 |
| 2015/0341724 A1* | 11/2015 | Pedersen | H04W 4/80 |
| | | | 381/300 |
| 2016/0119745 A1* | 4/2016 | Choi | H04W 76/15 |
| | | | 455/566 |
| 2018/0286414 A1* | 10/2018 | Ravindran | G10L 15/08 |
| 2022/0253273 A1* | 8/2022 | Lee | H04L 67/30 |
| 2022/0368754 A1* | 11/2022 | Zhu | H04L 65/80 |
| 2024/0046939 A1* | 2/2024 | Vasilache | G10L 19/008 |
| 2024/0185869 A1* | 6/2024 | Laitinen | G10L 19/032 |
| 2024/0212696 A1* | 6/2024 | Vasilache | G10L 19/032 |

FOREIGN PATENT DOCUMENTS

| | | | |
|---|---|---|---|
| CN | 111787633 A | 10/2020 | |
| WO | WO-2019211024 A1 * | 11/2019 | H04W 72/56 |

OTHER PUBLICATIONS

Written Opinion of the International Searching Authority received for PCT/CN2021/095017, dated Aug. 9, 2021.
First Office Action received for Chinese Application No. 202010810786.9, dated May 10, 2022.

* cited by examiner

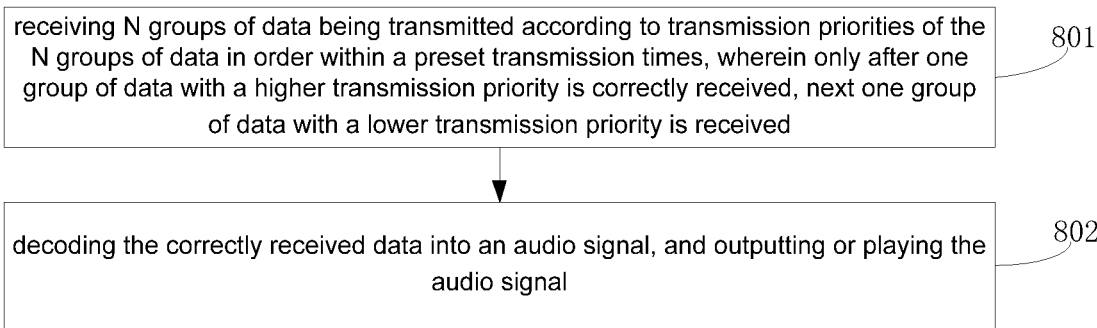

receiving N groups of data being transmitted according to transmission priorities of the N groups of data in order within a preset transmission times, wherein only after one group of data with a higher transmission priority is correctly received, next one group of data with a lower transmission priority is received | 801 decoding the correctly received data into an audio signal, and outputting or playing the audio signal | 802

FIG. 8

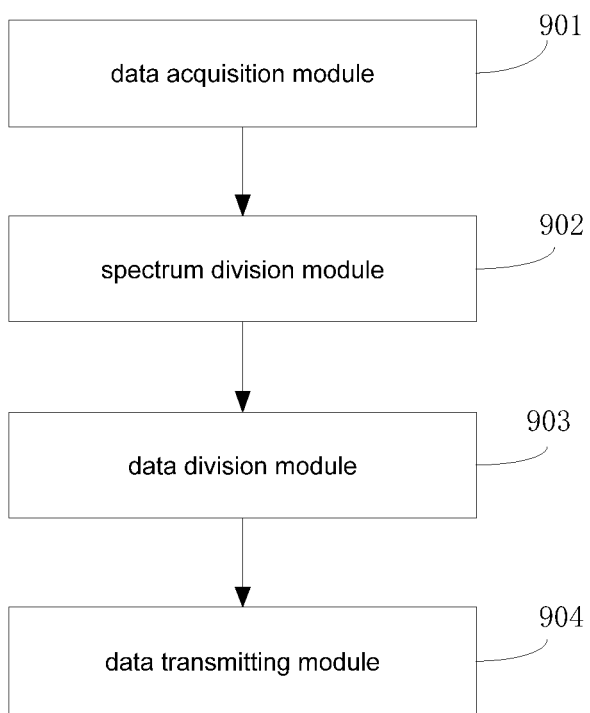

data acquisition module | 901 spectrum division module | 902 data division module | 903 data transmitting module | 904

FIG. 9

METHOD AND DEVICE FOR TRANSMITTING AUDIO DATA BASED ON BLUETOOTH LOW ENERGY

CROSS-REFERENCES TO RELATED APPLICATIONS

The present invention is a continuation of PCT/CN2021/095017, filed on May 21, 2021, which claims the priority of Chinese Patent Application No.: 202010810786.9 filed in China on Aug. 13, 2020, the entire contents of which are incorporated herein by reference.

FIELD OF THE INVENTION

The present invention relates to the field of wireless communication technology, in particular to a method and a device for transmitting audio data based on Bluetooth low energy.

BACKGROUND TECHNOLOGY

Wireless technology brings people unrestrained freedom to talk and enjoy music, and has been widely used. In particular, Bluetooth Low Energy (BLE) Audio technology brings people lower power consumption, lower cost and higher quality wireless audio services. Especially, Bluetooth Low Energy (BLE) audio technology based on a Connected Isochronous Stream (CIS) and a Low Complexity Communication Codec (LC3) will bring people lower power consumption, lower cost and higher quality of wireless audio service.

However, wireless transmission distance, fading and interference level of wireless communication environment in application scenario of the Bluetooth low energy audio technology may be constantly changing. A limited retransmission strategy based on CIS maximum transmission delay limit and a service quality solution with fixed coding parameters is difficult to adapt to the changes of the wireless transmission distance and the wireless communication environment. The solution that adjust the maximum transmission delay and the coding parameters based on information feedback according to the changes of the wireless transmission distance and the wireless communication environment are also difficult to adapt to rapid changes of the wireless transmission distance and the fading and the interference level of wireless communication environment.

Therefore, it is necessary to propose an improved technique to solve the above problems among others.

SUMMARY OF THE INVENTION

The present invention discloses a method and a device for transmitting audio data based on Bluetooth low energy, which can improve adaptability of Bluetooth low energy audio data transmission to changes of wireless transmission distance or fading and interference levels of wireless communication environment.

To achieve the purpose, according to one aspect of the present invention, a method for transmitting audio data based on Bluetooth low energy is provided. The method for transmitting audio data based on Bluetooth low energy comprises: obtaining a plurality of audio data frames to be transmitted; dividing a quantized spectrum of each audio data frame into M groups of spectrum respectively, wherein M is a positive integer greater than 1, and dividing each audio data frame into N groups of data based on the M groups of spectrum, wherein N is a positive integer greater than 1, and the N groups of data have different transmission priorities; and According to a second aspect of the present invention, a method for transmitting audio data based on Bluetooth low energy is provided. The method for transmitting audio data based on Bluetooth low energy comprises: receiving N groups of data being transmitted according to transmission priorities of the N groups of data in order within a preset transmission times range, wherein only after one group of data with a higher transmission priority is correctly received, next one group of data with a lower transmission priority is received, and N is a positive integer greater than 1.

According to a second aspect of the present invention, a device for transmitting audio data based on Bluetooth low energy is provided. The device for transmitting audio data based on Bluetooth low energy comprises: a data acquisition module configured for obtaining a plurality of audio data frames to be transmitted; a spectrum division module configured for dividing a quantized spectrum of each audio data frame into M groups of spectrum respectively, wherein M is a positive integer greater than 1; a data division module configured for dividing each audio data frame into N groups of data based on the M groups of spectrum, wherein N is a positive integer greater than 1, and the N groups of data have different transmission priorities; a data transmitting module configured for transmitting the N groups of data according to their respective transmission priorities within a preset transmission times range based on a predetermined Bluetooth low energy transmission protocol, wherein the group of data with a lower transmission priority is transmitted only after the group of data with a higher transmission priority is received correctly.

As can be seen from the above technical solutions, each audio data frame is divided into N groups of data with different transmission priorities, and the N groups of data are transmitted to the BLE playback device successively according to the transmission priorities, and the group of data with the lower transmission priority is transmitted after it is determined that the group of data with the higher transmission priority is correctly received. In the case of short distance or wireless communication environment with low fading and interference (i.e. good channel quality), high coding quality audio transmission is guaranteed. In the case of long distance or wireless communication environment with high fading and interference (i.e. poor channel quality), the coding quality is automatically reduced without feedback channel quality information to maintain smooth audio transmission. Therefore, it can adapt to rapid changes in transmission distance and fading and interference of wireless communication environment.

There are many other objects, together with the foregoing attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings wherein:

FIG. 8 is a flow chart showing a BLE audio data transmission method provided in a third embodiment of the present invention;

FIG. 9 is a schematic structural diagram of a BLE audio data transmission device provided in a fourth embodiment of the present invention;

DETAILED DESCRIPTION OF THE PREFERRED EMBODIMENTS

The detailed description of the invention is presented largely in terms of procedures, operations, logic blocks, processing, and other symbolic representations that directly or indirectly resemble the operations of data processing devices that may or may not be coupled to networks. These process descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be comprised in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Wireless audio technology is becoming more and more popular, such as Bluetooth Low Energy (BLE) audio technology. However, the wireless transmission distance, the fading and the interference level of the wireless communication environment are constantly changing. In order to improve the adaptability of audio signals to changes in the wireless transmission distance and the wireless communication environment, Bluetooth low energy audio data transmission method, device and equipment are provided according some embodiments of the present invention.

First Embodiment

For simplicity of description and ease of understanding, some embodiments of the present invention will be described using a BLE audio data transmission system shown in FIG. 1 as an exemplary scenario. It is understood that this scenario is not intended to limit the other possible implementations of the present invention.

Figure 1:
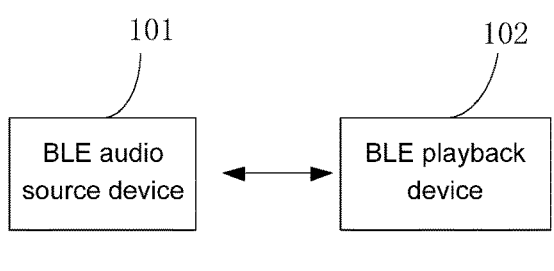
FIG. 1 is a schematic structural diagram of a Bluetooth low energy (BLE) audio data transmission system provided in a first embodiment of the present invention.

As shown in FIG. 1, the BLE audio data transmission system comprises a BLE audio source device 101 and a BLE playback device 102. The BLE audio source device 101 may be a smart phone, a tablet computer, a personal computer, a laptop computer, a smart watch, a speaker, a headset, a television, a game console, a game controller, a media hub, a Bluetooth adapter, a set-top box, etc. that supports BLE audio transmission technologies and protocols. The BLE audio source device 101 may be configured to transmit audio data to other BLE device which may be the BLE playback devices 102.

The BLE playback device 102 may be a smart phone, a tablet computer, a personal computer, a laptop computer, a smart watch, a speaker, a headset, a television, a game console, etc. that supports BLE audio transmission technologies and protocols. The BLE playback device 102 can be configured to receive audio data from other BLE device which can be the BLE audio source device 101, or devices that receive and forward the audio data, and output or play the audio data.

The BLE audio source device 101 can establish a wireless communication link with the BLE playback device 102 based on a predetermined BLE audio protocol to transmit audio data wirelessly. The predetermined BLE audio protocol may be a standard common protocol based on a Bluetooth specification, or may be a special protocol or private protocol suitable for the BLE audio technology.

Figure 2:
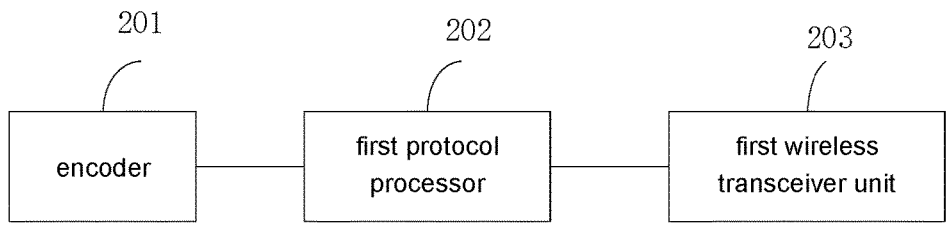
FIG. 2 is a schematic structural diagram of a BLE audio source device provided in the first embodiment of the present invention.
Figure 3:
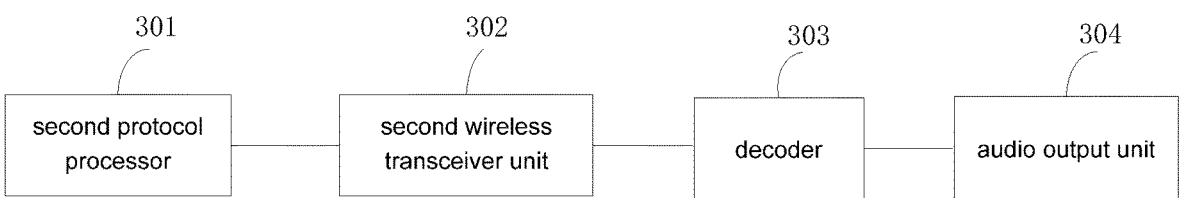
FIG. 3 is a schematic structural diagram of a BLE playback device provided in the first embodiment of the present invention.

In one embodiment, the BLE audio source device 101 comprises an encoder 201, a first protocol processor 202 and a first wireless transceiver unit 203 as shown in FIG. 2. The BLE playback device 102 comprises a second protocol processor 301, a second wireless transceiver unit 302, a decoder 303 and an audio output unit 304 as shown in FIG. 3.

The encoder 201 is configured to compress and encode the audio signal into a plurality of audio data frames using a high rate mode. The first protocol processor 202 is configured to establish a BLE link to enable wireless communication between the BLE audio source device 101 and the BLE playback device 102, and is also configured to establish a BLE link (e.g., a CIS link) to transmit audio data. The first wireless transceiver unit 203 is configured to transmit the audio data frames to the BLE playback device 102 according to the BLE audio protocol (e.g., CIS protocol).

The second protocol processor 301 is configured to execute the BLE audio protocol (e.g., CIS protocol) to control the second wireless transceiver unit 302 to receive the audio data frames. The second wireless transceiver unit 302 is configured to receive the audio data frames. The decoder 301 is configured to decode the audio data frames into the audio signal. The audio output unit 304 is configured for outputting or playing the audio signal.

In a specific implementation, the audio data frames to be transmitted are obtained firstly. In one embodiment, the BLE audio source device 101 is configured to encode the audio signal into a plurality of audio data frames. In one embodiment, a common compression coding method in the art can be used. As an optional implementation, the compression coding of the audio signal can be implemented with reference to a basic principle of a LC3 (Low Complexity Communications Codec) encoder. Referring to a LC3 specification of the BLE, each audio data frame encoded in a high rate mode mainly comprises: Side information, i.e., a configuration information of the audio data frame, a coded data of a Most Significant Bit (MSB) portion of a quantized spectrum, a symbol data of the quantized spectrum, a coded data of a Low Significant Bit (LSB) portion of the quantized spectrum.

Then, the BLE audio source device 101 is configured to divide the quantized spectrum of each audio data frame into M groups of spectrum respectively. M is a positive integer greater than 1. In one embodiment, the quantized spectrum of each audio data frame can be divided into M groups of spectrum based on an importance of the quantized spectra. Usually, the human ear is less sensitive to a high-frequency component of a sound signal than a low-frequency component of the sound signal, so the importance of the low-frequency component should be set higher than the importance of the high-frequency component, so that different transmission methods can be selected according to the importance of the components of the sound signal when the audio data is transmitted. For example, the quantized spectrum of each audio data frame can be divided into M groups of spectrum according to M−1 different preset threshold frequencies, wherein the importance of the group of spectrum below a lowest preset threshold frequency is the highest and the importance of the group of spectrum above a highest preset threshold frequency is the lowest.

Specifically, the component of the quantized spectrum below a first threshold frequency can be taken as a first group of spectrum with the highest importance, the component of the quantized spectrum above the first threshold frequency and below a second threshold frequency can be taken as a second group of spectrum with the second highest importance, . . . , and so on, and the component of the quantized spectrum above the M−1th threshold frequency is a Mth group of spectrum with the lowest importance. In other embodiment, the quantified spectrum can be divided according to other importance evaluation criteria, depending on an actual application scenario.

In one optional embodiment, M=2, i.e., the quantized spectrum is divided into two groups of spectrum which are called a primary spectrum and a secondary spectrum respectively. The primary spectrum is the component of the quantized spectrum that is less than or equal to the preset threshold frequency, and the secondary spectrum is the component of the quantized spectrum that is greater than the preset threshold frequency.

Next, each audio data frame is divided into N groups of data based on the M groups of spectrum. N is a positive integer greater than 1, and the N groups of data have different transmission priorities. When performing spectrum quantization processing on the audio signals, the more bits quantized is, the higher the quality of the recovered audio during decoding is. For a high quality audio signal, its quantized spectrum can be divided into a high bit portion (Most Significant Bit) and a low bit (Least Significant Bit) portion. By using the high bit portion independently, it is possible to decode and recover the audio signal with low-medium quality. Using both the high bit portion and the low bit portion, it can decode and recover the audio signal with high quality. Only using the low bit portion, it cannot recover the normal audio signal. Therefore, each audio data frame is divided into N groups of data in the present invention, and the coded data, which can be decoded independently to obtain the audio signal with the lowest quality and whose spectrum has the highest importance, are transmitted first. In one embodiment, the coded data, which can be decoded independently to obtain the audio signal with the lowest quality, in the coded data of one group of spectrum with the highest importance of one audio data frame is divided into one group of data with the highest transmission priority. The coded data comprising the rest of the coded data of one group of spectrum with the highest importance and the coded data of the other groups of spectrum of the one audio data frame is divided into other groups of data with different transmission priorities in order according to the importance of the other quantized spectrum, a bit order in which the other quantized spectrum is located, and a predetermined data length of each group of data. The data length of each group of data can be the same or different.

In one embodiment, the audio data frame is obtained by a high rate coding mode, and comprises a configuration information of the audio data frame, a coded data of the quantized spectrum and a symbol data of the quantized spectrum. When each audio data frame is divided into N groups of data, the configuration information of the audio data frame, the symbol data of M groups of spectrum and the coded data of the high bit portion of the group of the spectrum with the highest importance can be used as the group of data with the highest transmission priority. In this way, it is possible to ensure that the group of data with the highest transmission priority is received successfully and firstly by a receiving end during transmission, so that in the case of poor transceiver performance, the coding quality can be adaptively reduced while maintaining smooth audio transmission. The coded data of the low bit portion of the group of spectrum with the highest transmission priority, the coded data of the high bit portion of the group of spectrum with the next highest importance is divided into the group of data with the next highest transmission priority, and so on, and the coded data of the remaining groups of spectrum is divided into each group of data in turn according to the order of the importance of the remaining groups of spectrum and the order of the high bit portion first and then the low bit portion.

In one embodiment, M=2, N=2, the quantized spectrum of each audio data fame is divided into two groups of spectrum which are called a primary spectrum and a secondary spectrum respectively, and each audio data frame is divided into two groups of data which are called a first data group P1 and a second data group P2. The first data group P1 has higher transmission priority than the second data group P2. The first data group P1 comprises a configuration information of each audio data frame, a symbol data of the primary spectrum, a symbol data of the secondary spectrum, a coded data of a bit portion greater than or equal to a first predetermined threshold of the primary spectrum. The second data group P2 comprises a coded data of a bit portion greater than or equal to a second preset threshold of the secondary spectrum, a coded data of a bit portion less than the first predetermined threshold of the primary spectrum, and a coded data of a bit portion less than to the second preset threshold of the secondary spectrum.

Specifically, encoding configuration parameters of the BLE audio source device can be listed. A sampling rate is 48 kHz, a length of audio data frame is 10 ms, the number of sampling points per frame is 480, quantization bits per sampling point is 24. The data size of a mono audio data frame is 200 bytes, and a total mono encoding rate is 160 kbps. Each audio data frame is divided into two groups. The size of the first data group P1 is 120 bytes, and the mono encoding rate corresponding to the first data group P1 is 96 kbps. The size of the second data group P2 is 80 bytes, the mono encoding rate corresponding to the second data group P2 is 64 kbps. The total number of encoding frequencies is 480, the number of encoding frequencies of the primary spectrum is 360, and the number of encoding frequencies of the secondary spectrum is 120.

Finally, the BLE audio source device 101 is configured to transmit the N groups of data according to their respective transmission priorities within a preset transmission times range. The preset transmission times range can also be expressed as the preset number of transmission range, or the preset number of transmission threshold. The group of data with a lower transmission priority is transmitted only after the group of data with a higher transmission priority is received correctly. The present invention may employ various methods in the prior art for determining whether data has been correctly received, which are not specifically limited in the present invention.

Figure 4:
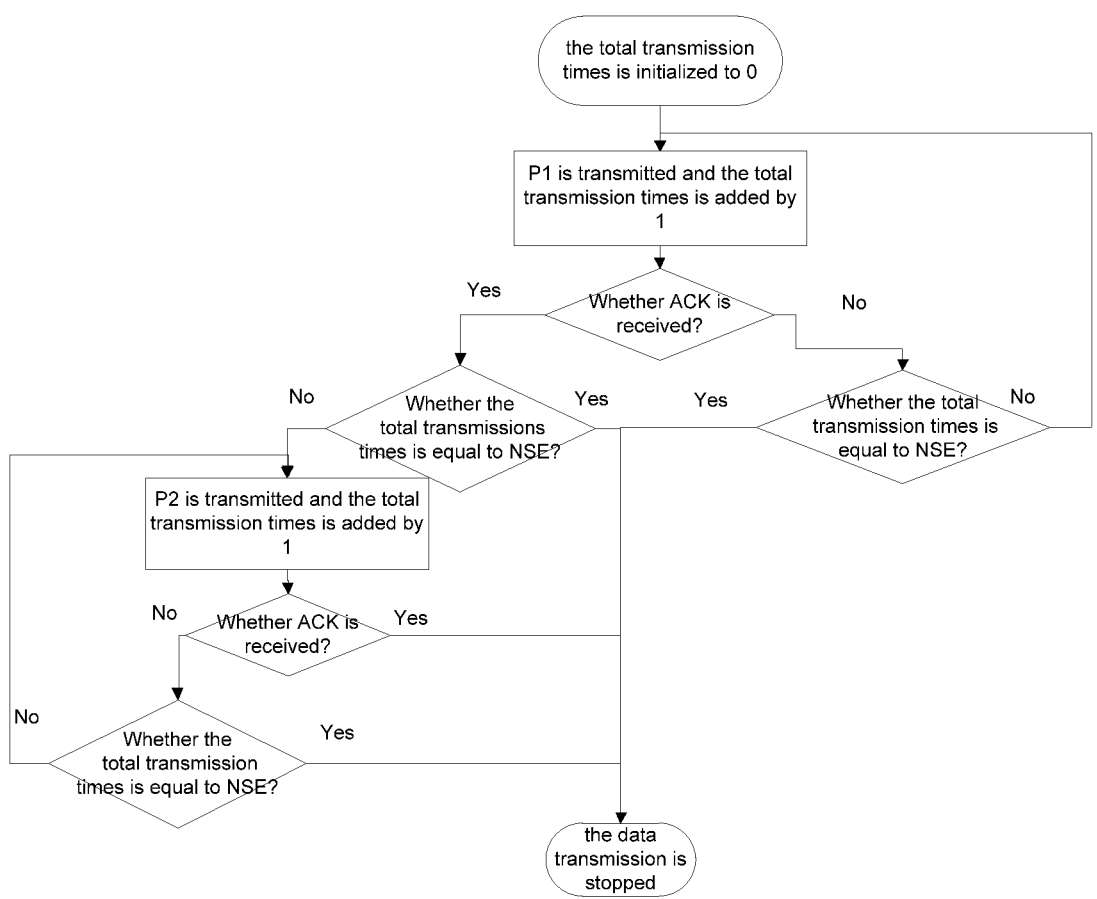
FIG. 4 is a flowchart of transmitting audio data frames by the BLE audio source device provided in the first embodiment of the present invention.

Specifically, the example of M=2, N=2, and CIS protocol is still used here for detailed explanation. As shown in FIG. 4, in each isochronous Interval, the total transmission times of P1 and P2 is initialized to 0. Within a preset transmission times range which is equal to the Number of Subevent (NSE) in one isochronous Interval, P1 is transmitted and the total transmission times are added by 1. If the P1 is correctly received by the BLE playback device 102, the BLE playback device 102 replies an acknowledgement signal representing correct reception ACK. If the P1 is not correctly received by the BLE playback device 102, an acknowledgement signal representing incorrect reception (sometimes also referred to as negative acknowledgement signal, NAK) NAK is replied by the BLE playback device 102 or no acknowledgement signal is replied. It is determined whether the acknowledgement signal representing correct reception ACK is received from the BLE playback device. If the acknowledgement signal ACK is not received from the BLE playback device 102, it is determined whether the total transmission times are equal to the preset transmission times range NSE. If yes, the data transmission is stopped, otherwise, P1 is retransmitted and the total transmission times are added by 1. If the acknowledgement signal ACK is received from the BLE playback device 102, it is determined whether the total transmission times are equal to NSE. If yes, the data transmission is stopped, otherwise, P2 is transmitted within the preset transmission times range NSE, and the total transmission times are added by 1. It is determined whether the acknowledgement signal representing correct reception ACK is received from the BLE playback device. If the acknowledgement signal ACK is received from the BLE playback device 102, the data transmission is stopped. If the acknowledgement signal ACK is not received from the BLE playback device 102, it is determined whether the total transmission times are equal to the preset transmission times range NSE. If yes, the data transmission is stopped, otherwise, P2 is retransmitted and the total transmission times are added by 1.

It should be understood that in some implementations, the "preset transmission times range" may exceed an isochronous Interval. In one subevent of one isochronous interval, the BLE audio source device can transmit one data group one time. In one embodiment, the BLE playback device 102 receives the N groups of data transmitted by the BLE audio source device 101 according to their transmission priority, decodes them into an audio signal and outputs or plays the audio signal. In this case, the BLE playback device 102 replies the acknowledgement signal representing correct reception ACK to the BLE audio source device after the group of data with higher transmission priority is received successfully, and then receives the group of data with the lower transmission priority.

The BLE playback device also counts a probability of not correctly receiving the group of data with the lower transmission priority. When the N groups of data are correctly received, the received N groups of data are decoded at a high rate and high quality mode to obtain the audio signal. When the probability of correctly receiving the group of data with the higher transmission priority and not correctly receiving the group of data with the lower transmission priority is lower than a preset probability threshold, the group of data with the lower transmission priority is recovered by a packet loss concealment technology, and the recovered group of data with the lower transmission priority and the received group of data with the higher transmission priority are decoded according to the high rate and high quality mode to obtain the audio signal. When the probability of correctly receiving the group of data with the higher transmission priority and not correctly receiving the group of data with the lower transmission priority is higher than the preset probability threshold, the received group of data with the higher transmission priority is decoded independently according to a medium-low rate and medium quality mode to obtain the audio signal.

Figure 5:
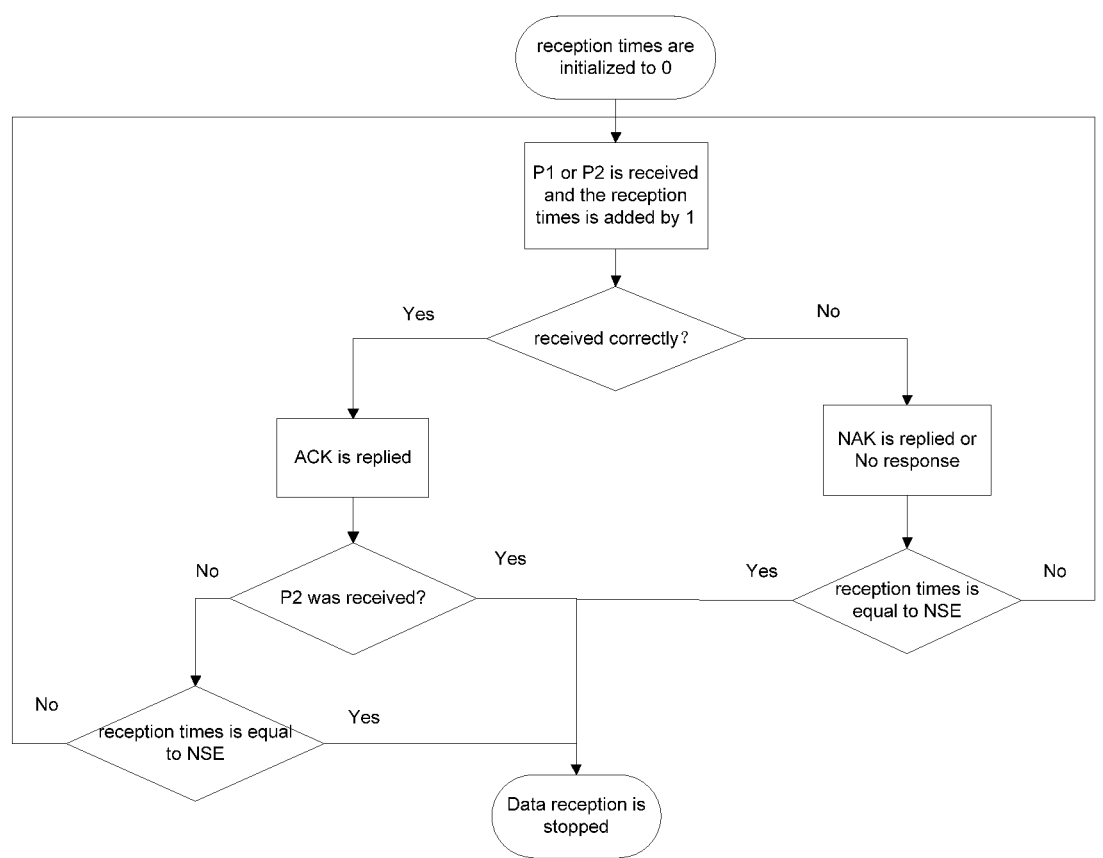
FIG. 5 is a flowchart of receiving audio data frames by the BLE playback device in the first embodiment of the present invention.

The BLE playback device 102 is also configured to output or play the audio signal obtained by decoding. Specifically, the example of M=2, N=2, is still used here for detailed explanation. As shown in FIG. 5, the reception times is initialized to 0 by the BLE playback device. P1 or P2 is received and the reception times is added by 1 within a preset reception times range in the isochronous Interval. The preset reception times range can also be expressed as the preset number of reception range, or the preset number of reception threshold. The preset reception times range may be equal to the preset transmission times range, they both are equal to NSE. It is determined whether the P1 or P2 is received correctly. If the P1 or P2 is not received correctly, the acknowledgement signal representing incorrect reception NAK is replied or no acknowledgement signal is replied. If the P1 or P2 is received correctly, the acknowledgement signal representing correct reception ACK is replied. When the acknowledgement signal representing incorrect reception NAK is replied or no acknowledgement signal is replied, it is determined whether the reception times is equal to the preset reception times range NSE. If the reception times is equal to the preset reception times range NSE, the data reception is stopped. If the reception times is less than the preset reception times range NSE, P1 or P2 is continued to be received, and the reception times is added by 1. When the acknowledgement signal representing correct reception ACK is replied, it is determine whether the received data is P2. If yes, the data reception is stopped. If not, it is determined whether the reception times is equal to the preset reception times range NSE. If the reception times is equal to the preset reception times range NSE, the data reception is stopped. If the reception times is not equal to the preset reception times range NSE, P1 or P2 is continued to be received, and the reception times is added by 1.

The BLE playback device counts the probability of not receiving P2 correctly during decoding. If P1 and P2 are received correctly within the preset receptions times in each time interval, the two groups of data P1 and P2 divided by one audio data frame are decoded into the audio signal at the high speed and high quality mode, and the audio signals are output or played back. If the probability of receiving P1 correctly and not receiving P2 correctly is less than the preset probability threshold, the Packet Loss Concealment (PLC) technique is configured to recover the coded data of the bit portion less than the first preset threshold of the primary spectrum, and the coded data of the bit portion greater than or equal to the first preset threshold of the secondary spectrum, the coded data of the bit portion less than the first preset threshold of the secondary spectrum, P1 and the recovered coded data are decoded according to the high rate and high quality mode to obtain the audio signal, and the audio signal is output or played back. If the probability of receiving P1 correctly and not receiving P2 correctly is greater than or equal to the preset probability threshold, P1 is decoded into the audio signal in a medium-low rate and medium quality mode, and the audio signal is output or played back. If P1 is not received correctly, the packet loss concealment (PLC) technique is used to recover the coded data of the bit portion greater than or equal to the first preset threshold of the primary spectrum, the recovered coded data of the bit portion greater than or equal to the first preset threshold of the primary spectrum is decoded as the audio signal in the medium-low rate and medium quality mode, and the audio signal is output or played back.

Taking M=2 and N=2 as one example, the process of the BLE audio source device transmitting N groups of data and the BLE playback device receiving N groups of data and performing audio decoding are described in detail. It should be understood that M and N can be other values respectively, which can be implemented by referring to the core idea described above, and will not be repeated here.

Figure 6:
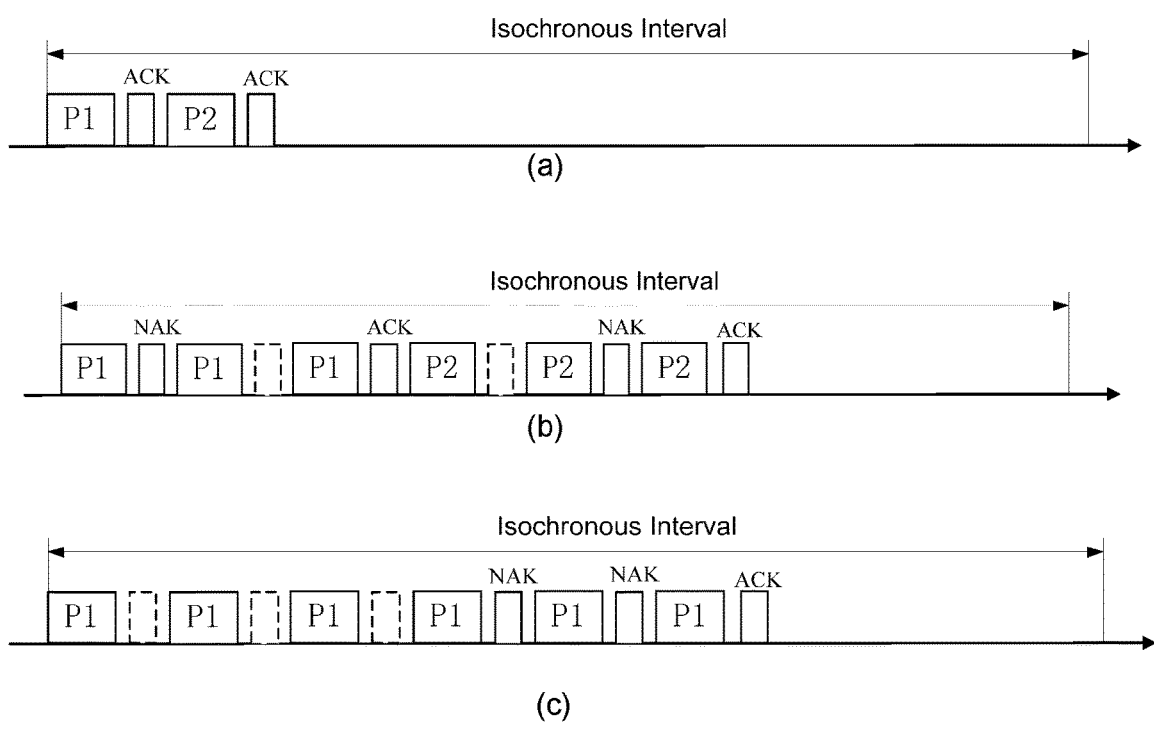
FIG. 6 is a receiving and transmitting timing diagram of a CIS link between the BLE audio source device and the BLE playback device provided in the first embodiment of the present invention.

FIG. 6 is a receiving and transmitting timing diagram of the BLE audio data transmission system in one embodiment of the present invention, wherein the BLE audio source device 101 communicates with the BLE playback device 102 over a CIS link therebetween. Take N=2 as an example, i.e., each audio data frame is divided into two groups of data, which are the first data group P1 and the second data group P2.

FIG. 6(a) represents a case of better transceiver performance. As shown in FIG. 6(a), the BLE audio source device 101 first transmits the first data group P1 and receives the acknowledgement signal representing correct reception ACK from the BLE playback device. The BLE audio source device continues to transmit the second data group P2 and also receives the acknowledgement signal representing correct reception ACK from the BLE playback device. The BLE audio source device stops transmitting and the BLE playback device stops receiving.

FIG. 6(b) represents a case of typical transceiver performance. As shown in FIG. 6(b), the BLE audio source device first transmits the first data group P1. The BLE audio source device receives the acknowledgement signal representing incorrect reception NAK from the BLE playback device for the first time and continues to transmit the first data group P1. The BLE audio source device does not receive the acknowledgement signal from the BLE playback device (as shown by the dotted line in FIG. 6(b)) for the second time and continues to transmit the first data group P1. The BLE audio source device receives the acknowledgement signal representing correct reception ACK for the third time and continues to transmit the second data group P2. The BLE audio source device does not receive the acknowledgement signal from the BLE playback device (as shown by the dotted line in FIG. 6(b)) for the fourth time and continues to transmit the second data group P2. The BLE audio source device receives the acknowledgement signal representing incorrect reception NAK from the BLE playback device for the fifth time and continues to transmit the second data group P2. The BLE audio source device receives the acknowledgement signal representing correct reception ACK for the sixth time, the transmission time is equal to NSE (NSE is 6 here for example) and the data transmission is stopped.

FIG. 6(c) represents a case of poor transceiver performance. The BLE audio source device transmits the first data group P1. The BLE audio source device does not receive the acknowledgement signal from the BLE playback device (as shown by the dotted line in FIG. 6(c)) for the first time and continues to transmit the first data group P1. The BLE audio device does not receive the acknowledgement signal from the BLE playback device (as shown by the dotted line in FIG. 6(c)) for the second time and continues to transmit the first data group P1. The BLE audio device does not receive the acknowledgement signal from the BLE playback device (as shown by the dotted line in FIG. 6(c)) for the third time and continues to transmit the first data group P1. The BLE audio device receives the acknowledgement signal representing incorrect reception NAK from the BLE playback device for the fourth time and continues to transmit the first data group P1. The BLE audio device receives the acknowledgement signal representing incorrect reception NAK from the BLE playback device for the fifth time and continues to transmit the first data group P1. The BLE audio device receives the acknowledgement signal representing correct reception ACK from the BLE playback device for the sixth time, the transmission time is equal to NSE and the data transmission is stopped. In this case, there is no opportunity to transmit the second data group P2, but the first data group P1 has enough transmission opportunities to be received correctly by the BLE playback device.

Therefore, the BLE audio data packet transmission system provided in the present invention in which the BLE audio source device communicates with the BLE playback device through the CIS link ensures that the audio transmission with high encoding quality is maintained in the wireless communication environment with short distance or low fading and interference, while the encoding quality is automatically reduced (i.e., only the first data group P1 is transmitted and there is no chance to transmit the second data group P2) without feedback of channel quality information to maintain smooth audio transmission in the wireless environment with long distance or high fading and interference. The transceiver performance scenarios shown in FIGS. 6(a), 6(b), and 6(c) are only schematic, and other scenarios are within the protection of some embodiments of the present invention.

Second Embodiment

Figure 7:
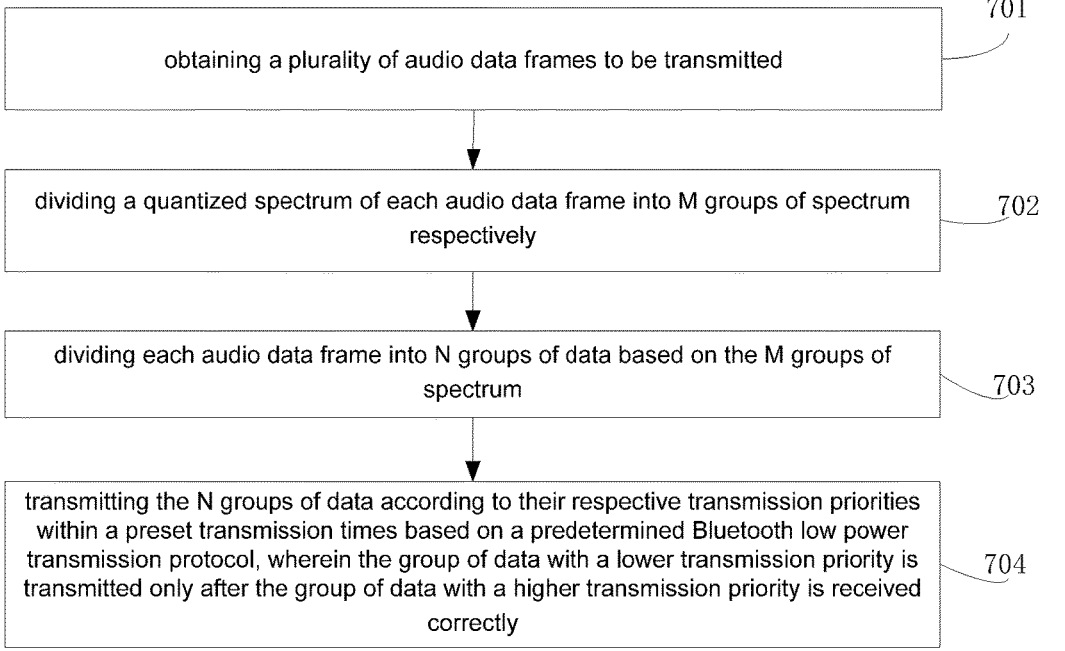
FIG. 7 is a flow chart showing a BLE audio data transmission method provided in a second embodiment of the present invention.

FIG. 7 is a flow chart showing a BLE audio data transmission method provided in a second embodiment of the present invention. As shown in FIG. 7, The method comprises following operations. At 701, a plurality of audio data frames to be transmitted is obtained. In one embodiment, the audio signal to be transmitted can be compressed and encoded into a plurality of audio data frame to be transmitted with reference to the LC3 encoding method, or other similar high rate encoding method. The audio data frame comprises configuration information of the audio data frame, a coded data of the quantized spectrum, and a symbol data of the quantized spectrum.

At 702, the quantized spectrum of each audio data frame is divided into M groups of spectrum, respectively. M is a positive integer greater than 1. In one embodiment, the quantized spectrum of each audio data frame is divided into M groups of spectrum respectively according to an importance of the quantized spectrum. Specifically, the quantized spectrum of each audio data frame is divided into M groups of spectrum according to M–1 different preset threshold frequencies, wherein the importance of the group of spectrum below a lowest preset threshold frequency is the highest and the importance of the group of spectrum above a highest preset threshold frequency is the lowest.

At 703, each audio data frame is divided into N groups of data respectively based on the M group of spectrum. N is a positive integer greater than 1, and the N groups of data have different transmission priorities. In one embodiment, one possible implementation of 703 is to divide a coded data, which can be decoded to obtain an audio signal with a lowest quality independently, in a coded data of one group of spectrum with the highest importance of one audio data frame into one group of data with the highest transmission priority; and divide a coded data of the other quantized spectrum of the one audio data frame into other groups of data with different transmission priorities in order according to the importance of the quantized spectrum, a bit order in which the other quantized spectrum is located, and a predetermined data length of each group of data. In addition, the group of data with the highest transmission priority further comprises the configuration information of the audio data frame and the symbol data of the M groups of spectrum.

At 704, the N groups of data is transmitted according to their respective transmission priorities within a preset transmission times range based on a predetermined Bluetooth low energy transmission protocol, wherein the group of data with a lower transmission priority is transmitted only after the group of data with a higher transmission priority is received correctly.

In one embodiment, one possible implementation of 704 is to receive an acknowledgement signal after transmitting one group of data with the higher transmission priority; determine that the one group of data with the higher transmission priority has been received correctly when the acknowledgement signal representing correct reception is received, and transmit next one group of data with the lower transmission priority within the preset transmission times range, and determine that the one group of data with the higher transmission priority has not been received correctly when the acknowledgement signal representing incorrect reception is received or no acknowledgement signal is received, and retransmitting the one group of data with the higher transmission priority within the preset transmission times range.

Third Embodiment

FIG. 8 is a flow chart showing a BLE audio data transmission method provided in a third embodiment of the present invention. The method comprises following operations. At 801, N groups of data being transmitted according to transmission priorities of the N groups of data in order is received within a preset reception times range, wherein only after one group of data with a higher transmission priority is correctly received, next one group of data with a lower transmission priority is received, and N is a positive integer greater than 1.

In one embodiment, the operation of 801 comprises: receiving one group of data with the higher transmission priority; transmitting an acknowledgement signal representing correct reception when the one group of data with the higher transmission priority has been received correctly, and then receiving next one group of data with the lower transmission priority within the preset reception times range; and transmitting an acknowledgement signal representing incorrect reception or not transmitting an acknowledgement signal when the one group of data with the higher transmission priority has not been received correctly, and then receiving the one group of data with the higher transmission priority again.

At 802, the correctly received data is decoded into an audio signal and the audio signal is outputted or played. In one embodiment, when the N groups of data are correctly received, the received N groups of data are decoded according to a high rate and high quality mode to obtain the audio signal; or when a probability of correctly receiving the group of data with the higher transmission priority and not correctly receiving the group of data with the lower transmission priority is lower than a preset probability threshold, the group of data with the lower transmission priority is recovered by a packet loss concealment technology, and the recovered group of data with the lower transmission priority and the received group of data with the higher transmission priority are decoded according to the high rate and high quality mode to obtain the audio signal; or when a probability of correctly receiving the group of data with the higher transmission priority and not correctly receiving the group of data with the lower transmission priority is higher than the preset probability threshold, the received group of data with the higher transmission priority is decoded according to a medium-low rate and medium quality mode to obtain the audio signal

Fourth Embodiment

FIG. 9 is a schematic structural diagram of a BLE audio data transmission device provided in a fourth embodiment of the present invention.

The device comprises: a data acquisition module 901 configured for obtaining a plurality of audio data frames to be transmitted; a spectrum division module 902 configured for dividing a quantized spectrum of each audio data frame into M groups of spectrum respectively, wherein M is a positive integer greater than 1; a data division module 903 configured for dividing each audio data frame into N groups of data based on the M groups of spectrum, wherein N is a positive integer greater than 1, and the N groups of data have different transmission priorities; a data transmitting module 904 configured for transmitting the N groups of data according to their respective transmission priorities within a preset transmission times range based on a predetermined Bluetooth low energy transmission protocol, wherein the group of data with a lower transmission priority is transmitted only after the group of data with a higher transmission priority is received correctly.

Clearly, the BLE audio data transmission device of the fourth embodiment can be used in the BLE audio data transmission system of the first embodiment, can also be implemented as the BLE audio source device 101 of the first embodiment, and can also be used to implement the BLE audio data transmission method of the second embodiment. The working principle of the BLE audio data transmission device can be referred to in the preceding embodiments and will not be repeated here.

Fifth Embodiment

Figure 10:
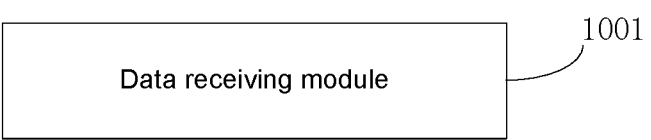
FIG. 10 is a schematic structural diagram of a BLE audio data transmission device provided in a fifth embodiment of the present invention.

FIG. 10 is a schematic structural diagram of a BLE audio data transmission device provided in a fifth embodiment of the present invention. The BLE audio data transmission device comprises a data receiving module 1001.

The data receiving module 1001 is configured for receiving N groups of data being transmitted according to transmission priorities of the N groups of data in order within a preset reception times range, wherein only after one group of data with a higher transmission priority is correctly received, next one group of data with a lower transmission priority is received, and N is a positive integer greater than 1.

Clearly, the BLE audio data transmission device of the fifth embodiment can be used in the BLE audio data transmission system of the first embodiment, can also be implemented as the BLE playback device 102 of the first embodiment, and can also be used to implement the BLE audio data transmission method of the third embodiment. The working principle of the BLE audio data transmission device can be referred to in the preceding embodiments and will not be repeated here.

Sixth Embodiment

A computer readable storage medium provided in the sixth embodiment of the present invention comprises a processor executable instruction configured to execute the BLE audio data packet transmission method corresponding to the second embodiment.

Seven Embodiment

A computer readable storage medium provided in the seventh embodiment of the present invention comprises a processor executable instruction configured to execute the BLE audio data packet transmission method corresponding to the third embodiment.

In one optional embodiment, the processor executable instruction may further be configured to perform both the BLE audio data transmission method corresponding to the second embodiment and the BLE audio data transmission method corresponding to the third embodiment. Thereby, the device or apparatus having the computer readable storage medium may function as both a transmitter and a receiver of the BLE audio data transmission.

Eighth Embodiment

Figure 11:
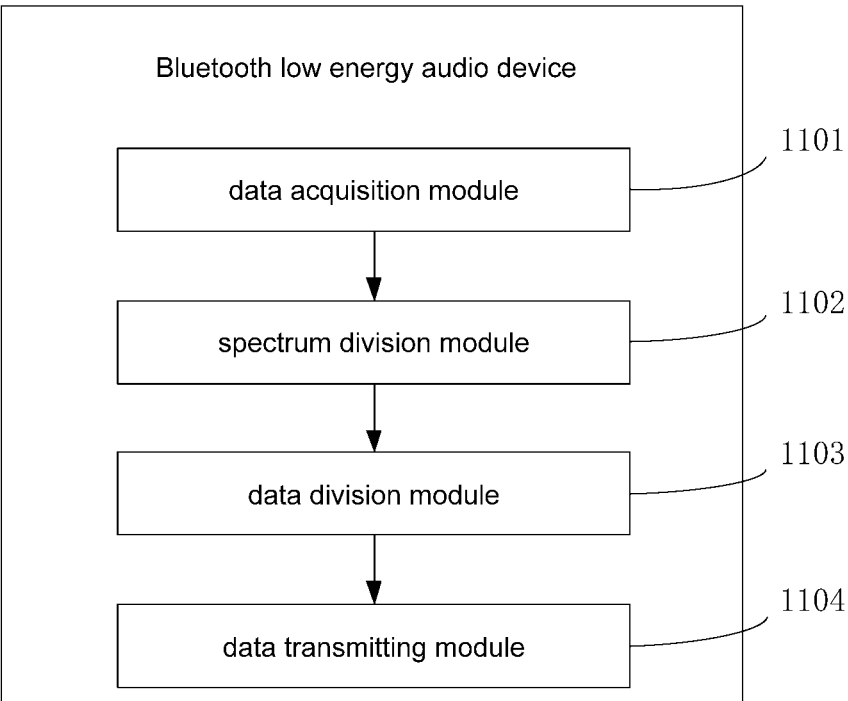
FIG. 11 is a schematic structural diagram of a BLE audio device provided in an eighth embodiment of the present invention.

FIG. 11 is a schematic structural diagram of a BLE audio device provided in an eighth embodiment of the present invention. As shown in FIG. 11, the BLE audio device performs the BLE audio data transmission method corresponding to the second embodiment and comprises the BLE audio data transmission device as shown in the fourth embodiment.

It should be noted that the data acquisition module 1101, the spectrum division module 1102, the data division module 1103 and the data transmission module 1104 in FIG. 11 correspond to the data acquisition module 901, the spectrum division module 902, the data division module 903 and the data transmission module 904 in FIG. 9, respectively. The working principle of the BLE audio device of this embodiment can be referred to the previous embodiment and will not be repeated here.

Ninth Embodiment

Figure 12:
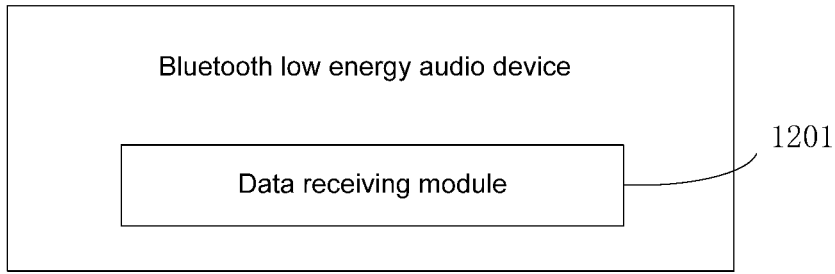
FIG. 12 is a schematic structural diagram of a BLE audio device provided in a ninth embodiment of the present invention.

FIG. 12 is a schematic structural diagram of the BLE audio device provided in a ninth embodiment of the present invention.

As shown in FIG. 12, the BLE audio device performs the BLE audio data transmission method corresponding to the third embodiment, and comprises a BLE audio data transmission device as shown in the fifth embodiment. In one embodiment, it may also comprise a signal decoding module configured for decoding the correctly received data into an audio signal and outputting or playing the audio signal.

It is noted that the data receiving module 1201 in FIG. 12 corresponds to the data receiving module 1001 in FIG. 10. The working principle of the BLE audio device of this embodiment can be referred to the previous embodiment and will not be repeated here.

Those skilled in the art should be aware that the embodiments of this application may be methods, systems, or computer program products. Accordingly, the present invention may take the form of a complete hardware embodiment, a complete software embodiment, or an embodiment in conjunction with software and hardware aspects. Furthermore, the present invention may take the form of a computer program product implemented on one or more computer-available storage media (comprising, but not limited to, disk memory, CD-ROM, optical memory, etc.) containing computer-available program code.

The present invention is described with reference to methods, equipment (systems), and flow charts and/or block diagrams of computer program products according to the embodiment of the present invention. It should be understood that each flow and/or block in a flowchart and/or block diagram, as well as the combination of flow and/or block in a flowchart and/or block diagram, can be implemented by computer program instructions. These computer program instructions may be provided to a processor of a general purpose computer, a dedicated computer, an embedded processor, or other programmable data processing device to produce a machine such that instructions executed by a processor of a computer or other programmable data processing device produce instructions for implementing a flow chart or more. A device for processes and/or block diagrams or functions specified in a box or multiple boxes.

These computer program instructions may also be stored in a computer-readable memory that may guide a computer or other programmable data processing device to work in a particular way, such that the instructions stored in the computer-readable memory generate a manufacturer comprising an instruction device that is implemented in a flow chart one or more processes. Process and/or block diagram, a box or function specified in multiple boxes.

These computer program instructions may also be loaded on a computer or other programmable data processing device such that a series of operational steps are performed on a computer or other programmable device to produce computer-implemented processing, thereby providing instructions executed on a computer or other programmable device for implementing a flow chart. The steps of a process or multiple processes and/or block diagrams, or functions specified in a box.

Although preferred embodiments of the present invention have been described, additional changes and modifications to these embodiments may be made once the basic creative concepts are known to those skilled in the art. The appended claims are therefore intended to be interpreted to comprise preferred embodiments and all changes and modifications falling within the scope of this application.

Obviously, a person skilled in the art may make various changes and variations to the application without departing from the spirit and scope of the application. Thus, if these modifications and variations of this application fall within the scope of the claims and their equivalent technologies, the application is also intended to comprise these changes and variations.

I claim:

1. A method for transmitting audio data based on Bluetooth low energy, comprising: obtaining a plurality of audio data frames to be transmitted;

dividing a quantized spectrum of each audio data frame into M groups of spectrum respectively, wherein M is a positive integer greater than 1;

dividing each audio data frame into N groups of data and assigning each of the N groups of audio data a respective transmission priority based on a respective importance level associated with each of the M groups of spectrum, wherein the respective importance level associated with each of the M groups of spectrum is set based on at least one preset threshold frequency, and wherein N is a positive integer greater than 1, and the N groups of data have different transmission priorities; and transmitting the N groups of data according to their respective transmission priorities within a preset transmission times range based on a predetermined Bluetooth low energy transmission protocol, wherein the group of data with a lower transmission priority is transmitted only after the group of data with a higher transmission priority is received correctly.

2. The method according to claim 1, wherein said dividing a quantized spectrum of each audio data frame into M groups of spectrum respectively comprises: dividing the quantized spectrum of the each audio data frame into M groups of spectrum respectively according to an importance level of the quantized spectrum.

3. The method according to claim 2, wherein said dividing the dividing the quantized spectrum of each audio data frame into M groups of spectrum respectively according to the importance level of the quantized spectrum, comprises:

dividing the quantized spectrum of the each audio data frame into M groups of spectrum according to M−1 different preset threshold frequencies, wherein the importance level of the group of spectrum below a lowest preset threshold frequency is the highest and the importance level of the group of spectrum above a highest preset threshold frequency is the lowest.

4. The method according to claim 2, wherein said dividing each audio data frame into N groups of data based on the M groups of spectrum, comprises:

dividing a coded data, which can be decoded to obtain an audio signal with a lowest quality independently, in a coded data of one group of spectrum with the highest importance level of one audio data frame into one group of data with the highest transmission priority; and dividing a coded data of the other quantized spectrum of the one audio data frame into other groups of data with different transmission priorities in order according to the importance level of the quantized spectrum, a bit order in which the other quantized spectrum is located, and a predetermined data length of each group of data.

5. The method according to claim 4, wherein the audio data frame is obtained by a high rate coding mode, and comprises a configuration information of the audio data frame, a coded data of the quantized spectrum and a symbol data of the quantized spectrum, the group of data with the highest transmission priority further comprises the configuration information of the audio data frame and the symbol data of the M groups of spectrum.

6. The method according to claim 2, wherein the quantized spectrum of each audio data fame is divided into two groups of spectrum which are called a primary spectrum and a secondary spectrum respectively, and each audio data frame is divided into two groups of data which are called a first data group P1 and a second data group P2, the first data group P1 has higher transmission priority than the second data group P2, the first data group P1 comprises a configuration information of each audio data frame, a symbol data of the primary spectrum, a symbol data of the secondary spectrum, a coded data of a bit portion greater than or equal to a first predetermined threshold of the primary spectrum;

the second data group P2 comprises a coded data of a bit portion greater than or equal to a second preset threshold of the secondary spectrum, a coded data of a bit portion less than the first predetermined threshold of the primary spectrum, and a coded data of a bit portion less than to the second preset threshold of the secondary spectrum.

7. The method according to claim 1, wherein said transmitting the N groups of data according to their respective transmission priorities within a preset transmission times range based on a predetermined Bluetooth low energy transmission protocol comprises: receiving an acknowledgement signal after transmitting one group of data with the higher transmission priority;

determining that the one group of data with the higher transmission priority has been received correctly when the acknowledgement signal representing correct reception is received, and transmitting next one group of data with the lower transmission priority within the preset transmission times range;

determining that the one group of data with the higher transmission priority has not been received correctly when the acknowledgement signal representing incorrect reception is received or no acknowledgement signal is received, and retransmitting the one group of data with the higher transmission priority within the preset transmission times range.

8. A method for transmitting audio data based on Bluetooth low energy, comprising: receiving N groups of data being transmitted according to transmission priorities of the N groups of data in order within a preset reception times range, wherein each of the N groups of audio data is assigned a respective transmission priority based on a respective importance level associated with each of M groups of spectrum of the audio data, wherein the respective importance level associated with each of the M groups of spectrum is set based on at least one preset threshold frequency, and wherein only after one group of data with a higher transmission priority is correctly received, next one group of data with a lower transmission priority is received, and N is a positive integer greater than 1.

9. The method according to claim 8, wherein the receiving N groups of data being transmitted according to transmission priorities of the N groups of data in order within a preset reception times range, comprises:

receiving one group of data with the higher transmission priority;

transmitting an acknowledgement signal representing correct reception when the one group of data with the higher transmission priority has been received correctly, and then receiving next one group of data with the lower transmission priority within the preset reception times range; and transmitting an acknowledgement signal representing incorrect reception or not transmitting an acknowledgement signal when the one group of data with the higher transmission priority has not been received correctly, and then receiving the one group of data with the higher transmission priority again.

10. The method according to claim 8, further comprising:

decoding the correctly received data into an audio signal, and outputting or playing the audio signal; wherein when the N groups of data are correctly received, the received N groups of data are decoded according to a high rate and high quality mode to obtain the audio signal; or when a probability of correctly receiving the group of data with the higher transmission priority and not correctly receiving the group of data with the lower transmission priority is lower than a preset probability threshold, the group of data with the lower transmission priority is recovered by a packet loss concealment technology, and the recovered group of data with the lower transmission priority and the received group of data with the higher transmission priority are decoded according to the high rate and high quality mode to obtain the audio signal; or when a probability of correctly receiving the group of data with the higher transmission priority and not correctly receiving the group of data with the lower transmission priority is higher than the preset probability threshold, the received group of data with the higher transmission priority is decoded independently according to a medium-low rate and medium quality mode to obtain the audio signal.

11. A device for transmitting audio data based on Bluetooth low energy, comprising:

a data acquisition module configured for obtaining a plurality of audio data frames to be transmitted;

a spectrum division module configured for dividing a quantized spectrum of each audio data frame into M groups of spectrum respectively, wherein M is a positive integer greater than 1;

a data division module configured for dividing each audio data frame into N groups of data based on the M groups of spectrum, wherein N is a positive integer greater than 1, and each of the N groups of audio data are assigned different transmission priorities based on a respective importance level associated with each of the M groups of spectrum, wherein the respective importance level associated with each of the M groups of spectrum is set based on at least one preset threshold frequency;

a data transmitting module configured for transmitting the N groups of data according to their respective transmission priorities within a preset transmission times range based on a predetermined Bluetooth low energy transmission protocol, wherein the group of data with a lower transmission priority is transmitted only after the group of data with a higher transmission priority is received correctly.

12. The device according to claim 11, wherein the spectrum division module is configured for:

dividing the quantized spectrum of each audio data frame into M groups of spectrum according to M−1 different preset threshold frequencies, wherein the importance level of the group of spectrum below a lowest preset threshold frequency is the highest and the importance level of the group of spectrum above a highest preset threshold frequency is the lowest.

13. The device according to claim 12, wherein the data division module is configured for:

dividing a coded data, which can be decoded to obtain an audio signal with a lowest quality independently, in a coded data of one group of spectrum with the highest importance level of one audio data frame into one group of data with the highest transmission priority; and dividing a coded data of the other quantized spectrum of the one audio data frame into other groups of data with different transmission priorities in order according to the importance level of the quantized spectrum, a bit order in which the other quantized spectrum is located, and a predetermined data length of each group of data.

14. The device according to claim 13, wherein the audio data frame is obtained by a high rate coding mode, and comprises a configuration information of the audio data frame, a coded data of the quantized spectrum and a symbol data of the quantized spectrum, the group of data with the highest transmission priority further comprises the configuration information of the audio data frame and the symbol data of the M groups of spectrum.

15. The device according to claim 12, wherein the quantized spectrum of each audio data fame is divided into two groups of spectrum which are called a primary spectrum and a secondary spectrum respectively, and each audio data frame is divided into two groups of data which are called a first data group P1 and a second data group P2, the first data group P1 has higher transmission priority than the second data group P2, the first data group P1 comprises a configuration information of each audio data frame, a symbol data of the primary spectrum, a symbol data of the secondary spectrum, a coded data of a bit portion greater than or equal to a first predetermined threshold of the primary spectrum;

the second data group P2 comprises a coded data of a bit portion greater than or equal to a second preset threshold of the secondary spectrum, a coded data of a bit portion less than the first predetermined threshold of the primary spectrum, and a coded data of a bit portion less than to the second preset threshold of the secondary spectrum.

16. The device according to claim 11, wherein the data transmitting module is configured for:

receiving an acknowledgement signal after transmitting one group of data with the higher transmission priority;

determining that the one group of data with the higher transmission priority has been received correctly when the acknowledgement signal representing correct reception is received, and transmitting next one group of data with the lower transmission priority within the preset transmission times range;

determining that the one group of data with the higher transmission priority has not been received correctly when the acknowledgement signal representing incorrect reception is received or no acknowledgement signal is received, and retransmitting the one group of data with the higher transmission priority within the preset transmission times range.

* * * * *